(12) United States Patent
Schaffer

(10) Patent No.: US 8,012,065 B2
(45) Date of Patent: Sep. 6, 2011

(54) COUPLER

(75) Inventor: Jonathan Michael Schaffer, Woking (GB)

(73) Assignee: Plum Products Ltd., Surrey (GB)

( * ) Notice: Subject to any disclaimer, the term of this patent is extended or adjusted under 35 U.S.C. 154(b) by 0 days.

(21) Appl. No.: 12/440,506

(22) PCT Filed: Sep. 10, 2007

(86) PCT No.: PCT/GB2007/003400
§ 371 (c)(1),
(2), (4) Date: Dec. 1, 2009

(87) PCT Pub. No.: WO2008/029166
PCT Pub. Date: Mar. 13, 2008

(65) Prior Publication Data
US 2010/0075810 A1    Mar. 25, 2010

(30) Foreign Application Priority Data

Sep. 8, 2006  (GB) ................................ 0617655.6
Mar. 3, 2007  (GB) ................................ 0704160.1

(51) Int. Cl.
*A63B 21/00* (2006.01)
(52) U.S. Cl. ................. 482/27; 482/28; 403/28
(58) Field of Classification Search ............... 482/35, 482/27, 28; 52/657; 403/282, 205, 385, 403/28
See application file for complete search history.

(56) References Cited

U.S. PATENT DOCUMENTS

| | | | |
|---|---|---|---|
| 2,819,755 A | 1/1958 | Berger et al. | |
| 3,502,357 A * | 3/1970 | Wagner | 403/205 |
| 4,267,682 A * | 5/1981 | Fowler et al. | 52/657 |
| 4,415,151 A | 11/1983 | Daniels | |
| 5,015,116 A * | 5/1991 | Nardone et al. | 403/28 |
| 5,119,690 A | 6/1992 | Shu | |
| 6,036,620 A | 3/2000 | Yang | |
| 6,099,195 A * | 8/2000 | Egner-Walter | 403/282 |
| 6,974,276 B2 * | 12/2005 | Kirchner et al. | 403/385 |
| 7,494,444 B2 * | 2/2009 | Adams | 482/27 |
| 2004/0091307 A1 | 5/2004 | James | |
| 2004/0176214 A1 * | 9/2004 | Yueh | 482/27 |
| 2006/0189441 A1 | 8/2006 | VanElverdinghe et al. | |

FOREIGN PATENT DOCUMENTS

GB    2 435 433 A    8/2007
WO    WO 2006/078087 A1    7/2006

* cited by examiner

*Primary Examiner* — Jerome W Donnelly
(74) *Attorney, Agent, or Firm* — Rabin & Berdo, PC

(57) ABSTRACT

Embodiments of hollow generally T-shaped couplers suitable for coupling respective ends of two tubular members to an upright member for a trampoline support are disclosed. Neither manufacture of the coupler nor the manner of its coupling between the tubular members and the upright member requires welds. The coupler has a hollow cross piece for coupling with the respective ends of the two tubular members. It also has a hollow upright piece extending from an underside of and intersecting the cross piece that receives in female fashion a male end of the upright member. Both the underside of the cross piece and sides of the upright piece are of split form along their respective lengths. The upright piece is provided with location regions that cooperate with corresponding location regions on the male end of the upright member to locate the upright member longitudinally of the upright piece. The coupler is provided with fixings to draw the splits together, thereby tightening the upright piece about the located upright member.

13 Claims, 11 Drawing Sheets

COUPLER

BACKGROUND

This disclosure relates to couplers, more particularly but not necessarily exclusively, for coupling support structures for supporting a trampoline sheet.

A typical trampoline comprises a sheet, usually, though not invariably, circular, supported around its periphery within a frame like support structure by spring couplings (usually a plurality of helical springs or an elastic cord) under tension which link apertures around the edge of the sheet to, openings in the frame. The frame will generally have a configuration that matches that of the trampoline sheet. Thus, when the trampoline sheet is circular, the frame will usually take the form of a generally circular ring with a diameter larger than that of the sheet in order that the sheet is stretched. When the trampoline sheet is rectangular in shape, the frame will usually comprise a ring of generally rectangular form that is similarly larger than the sheet in order that the sheet may be supported by helical springs under tension. The frame must be supported above the ground or floor. A typical trampoline support structure comprises a plurality of tubular members adapted to fit together to form the particular configuration of frame. At least some of the tubular members have a stub pipe welded thereto, which is adapted to interfit with an upper end of a respective leg, the several legs together supporting the frame and the trampoline sheet above the ground or floor. The respective legs are suitably tubular and pairs of legs will typically be formed from a single tube bent into a generally U- or W-shape in which the uprights of the U or W form the legs proper, the lower ends of which are interconnected by the bight portion of the U or the central portion of the W. In the case of a U-shaped structure, the bight portion of the U provides support from the floor or ground, whereas in a W-shaped structure the lower angular corners of the "W" serve the same purpose.

Trampolines in normal use are subjected to repeated stress. When used contrary to the manufacturer's instructions, for example on an uneven surface, by being dragged from one position to another, by a user jumping from an off-centre position, and when more than one person is on the trampoline at any one time, they are stressed unevenly, and often excessively. Moreover, they are often treated as garden equipment and left out in the cold and wet. As a result, corrosion or splitting of the welds between the tubular members and the stub pipes may occur over time, weakening the structure, potentially giving rise to a dangerous accident for a trampoline user.

In one attempt to overcome this problem, Thomas A James proposes a structural coupler for joining the tubular members and the legs in US 2004/0091307. The coupler is substantially T-shaped, providing a cross member support tube for receiving ends of tubular members of the frame and an intersecting support tube for receiving the upper end of a leg. The coupler avoids welds by starting from a single piece of pre-formed metal bending it to create a complete tube and a complete cross member. Seams are formed at overlapping edges, the seams running up sides of the intersecting tube member and then along the undersides of the cross-member. Either the seaming must be performed on site about butted or overlapping ends of two tubular members and about the upper end of a leg to form the coupler in situ, or the coupler is preformed and seamed off site and ends of tubular members and the upper end of a leg are force fitted on site into the ends of the cross member and into the intersecting support tube. The first arrangement requires skilled operatives and so is impractical, the second does not provide a sufficiently reliable join.

In an alternative arrangement, Arthur Chu in AU2006100018 suggests avoiding welds by employing a coupler comprising a sleeve into which respective ends of tubular members forming the frame are loosely received with the end of one such tubular member located within the other. The sleeve is incomplete, its bottom wall being split, each half thereof being integral with one half of a split tubular portion, the two halves of which are adapted to be forced into the female opening at the upper end of a leg. The interfitted ends of the frame tubular members have through apertures. These are aligned with inwardly directed studs on the sides of the sleeve so that, as the split tubular portions are forced into the upper end of a leg, the sides of the sleeve are drawn together and the inwardly directed studs interengage with the aligned apertures. In this arrangement satisfactory holding of the frame tubular members is dependent upon the apertures and studs being aligned and upon the extent by which the split tubular portions are received within the leg. In practice reliable location of the split tubular portions in the upper end of the leg is difficult to achieve, and the connection is insufficiently reliable in use.

SUMMARY

We disclose herein an alternative and significantly more reliable solution to the assembly of trampolines without welds.

In accordance with a first aspect of this disclosure, there is provided, a hollow generally T-shaped coupler adapted to couple respective ends of two tubular members to an upright member, neither manufacture of the coupler nor the manner of its coupling between the tubular members and the upright member requiring welds, the coupler comprising a hollow cross piece adapted to couple with the respective ends of the said two tubular members, and a hollow upright piece extending from an underside of and intersecting the cross piece and adapted to receive in female fashion a male end of the said upright member, both the underside of the cross piece and sides of the upright piece being of split form along their respective lengths, the upright piece being provided with location regions adapted to cooperate with corresponding location regions on the male end of the upright member to locate the upright member longitudinally of the upright piece, and the coupler being provided with fixings adapted to draw the said splits together, thereby to tighten the upright piece about the located upright member and the cross piece about the ends of the tubular members.

The location regions on the upright member may comprise a circumextending groove or land or a part-circumextending portion thereof, and the location regions on the upright piece may comprise inwardly crimped portions thereof.

Preferably the hollow cross piece serves as a pair of female couplings for receiving in male fashion respective ends of two tubular members.

The cross piece may be four sided (preferably generally square) in cross-section, at least ends of the tubular members being similarly four sided in cross-section.

The coupler (apart from the fixings) may be formed of a single piece of metal or plastics folded to form the four-sided cross-section of the cross piece.

In an alternative arrangement, in which the cross piece need not be, but is preferably, four sided in cross section, the cross member has a top side opposite the said underside that is also split along its length, whereby the coupler (apart from the fixings) comprises two separate but complementary pieces of metal or plastics. The complementary pieces are preferably mirror images of each other and may be identical.

The fixings are preferably provided by bolts and nuts cooperating with through openings in flanges formed integrally with the upright piece adjacent the split.

In one embodiment, one or more of the fixings may be provided by a bolt and nut cooperating with openings in flanges formed integrally with the cross piece adjacent the split in its underside.

In another embodiment, respective flanges may be formed on each side of the split in facing configuration to each other, the flanges being provided with one or more openings for cooperating bolts and nuts, each flange being common to the upright piece and the crosspiece. Each flange may extend along substantially the entire length of the split.

This disclosure also extends to a support structure for a trampoline comprising a tubular frame for a trampoline sheet supported by a plurality of legs, the tubular frame being formed from a plurality of tubular members, and respective couplers as defined above both coupling ends of the tubular members together to form the said tubular frame and coupling upright ends of the legs to the frame.

This disclosure further extends to a trampoline comprising a trampoline sheet supported around its periphery from a support structure by spring couplings (preferably a plurality of helical springs or an interlaced elastic cord) under tension, the support structure comprising a tubular frame supported by a plurality of legs, the tubular frame being formed from a plurality of tubular members, and respective couplers as defined above both coupling ends of the tubular members together to form the said tubular frame and coupling upright ends of the legs to the frame.

BRIEF DESCRIPTION OF THE DRAWINGS

Particular embodiments are more particularly described hereinbelow by way of example only with reference to the accompanying drawings in which:—

DESCRIPTION OF PREFERRED EMBODIMENTS

Figure 1:
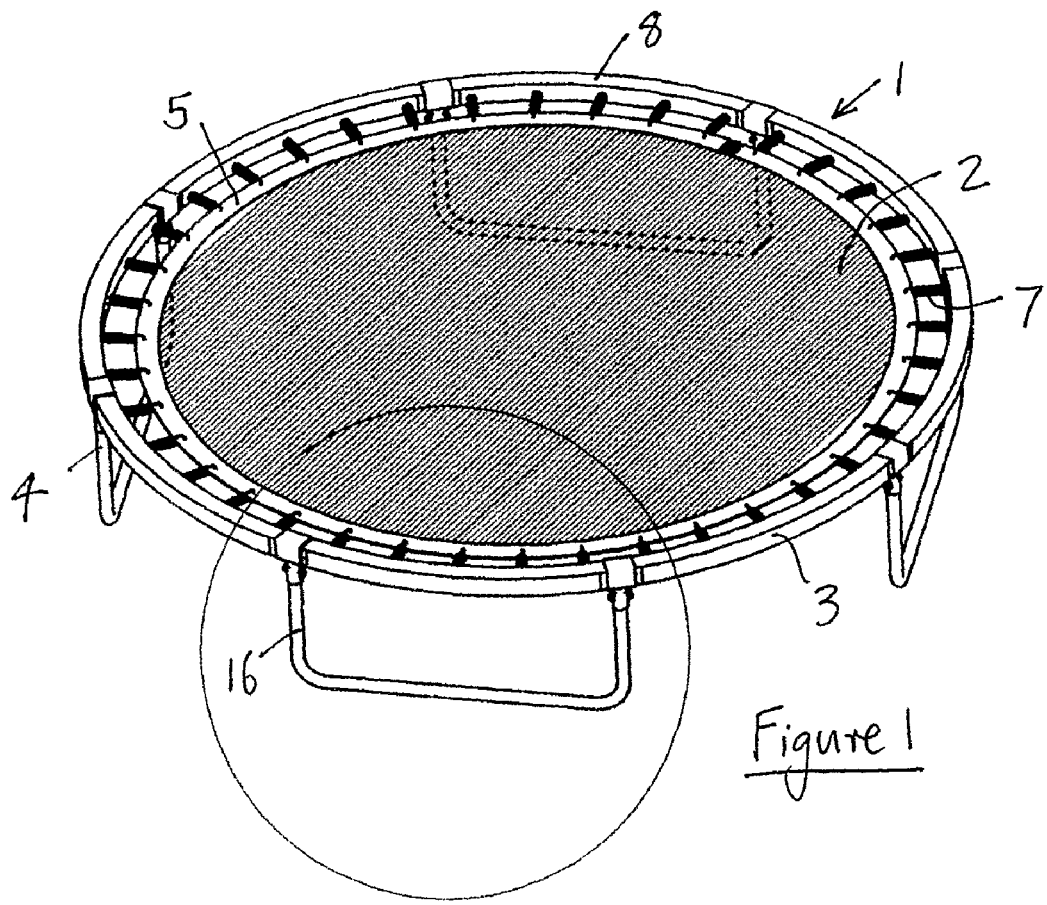
FIG. 1 is an overall perspective view of a trampoline.
Figure 2:
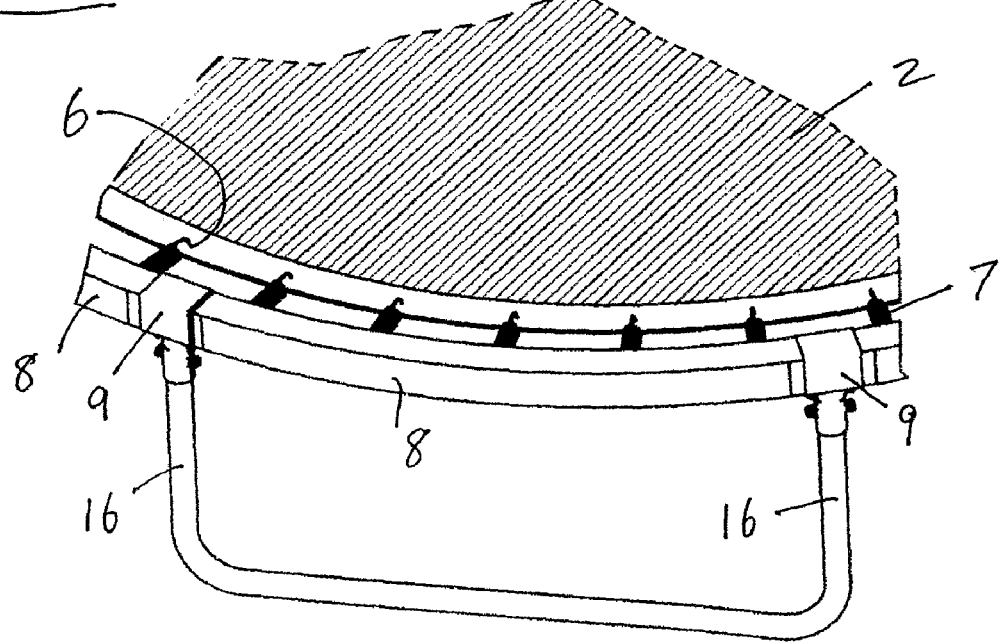
FIG. 2 is an enlarged view of the portion of FIG. 1 shown in a circle.
Figure 3:
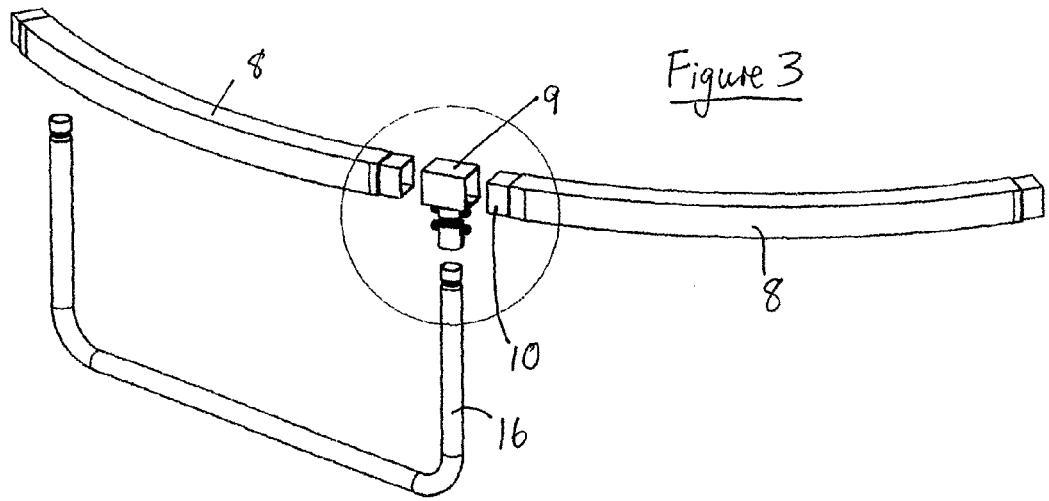
FIG. 3 is an exploded perspective view of portions of the trampoline frame, legs and coupler shown in FIG. 2.

Referring first to FIGS. 1, 2 and 3, there is shown a trampoline 1 comprising a trampoline sheet 2 stretched within a frame 3 forming part of a support structure 4 for the trampoline sheet. The sheet 3, here circular, has a reinforced edge 5 formed with a plurality of eyelets 6 into each of which is fitted one end of a respective helical spring 7, the other end of which is fitted into a respective opening in the frame 3. The openings for the springs are here provided on the radially inner side of the frame 3, but may, instead, be provided on the vertically upper side of the frame. As an alternative to a plurality of helical springs, another form of spring coupling could be used such as an elastic cord interlacing the eyelets 6 with openings in the frame.

As the sheet is circular, the frame 3 is of a generally circular ring form, but it will be understood, that the sheet may have other shapes, with a correspondingly shaped frame. Frame 3 comprises a plurality of tubular members 8, the opposite ends of which may be the same, unlike Chu's arrangement, making manufacture simpler.

Figure 4:
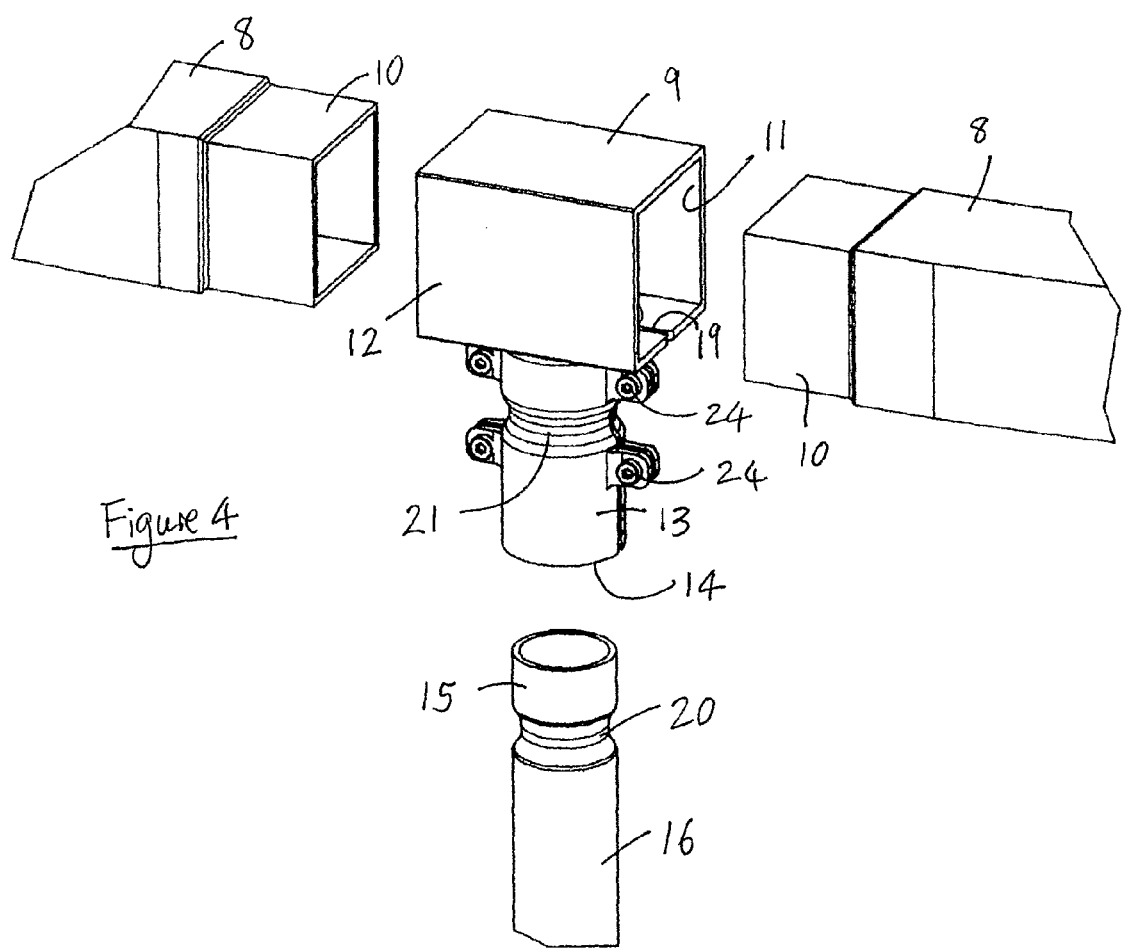
FIG. 4 is an enlarged view of the portion of FIG. 3 shown in a circle.

These members are connected together by respective hollow couplers 9 of generally T-form, as best shown in FIG. 4. In this embodiment, the tubular members have a square cross-section, and have end portions 10 of reduced cross-section that fit in male fashion within generally square-cross-section female openings 11 at the ends of the a hollow cross piece 12 of the T-coupler. Hollow upright piece 13 of the T-coupler provides a further female opening 14 for receiving upper end 15 of a respective leg 16 in male fashion. Upright piece 13 is of generally round tubular form and is of split form along its length on both sides, as best shown at 17 in FIGS. 5 and 6. Undersides 18 of the cross piece are also of split form along their lengths, as indicated at 19. This enables T-coupler 9 to be formed from a single piece of metal or plastics, as explained further below. Upper end 15 of leg 16 is formed with a circumextending groove or land 20 into which inwardly crimped portions 21 on the two halves of upright piece 13 are located. The two halves of upright piece 13 are formed with integral flanges 22 formed with through apertures 23 adapted to receive fixings 24 such as cooperating bolts and nuts (FIG. 4).

Figure 5:
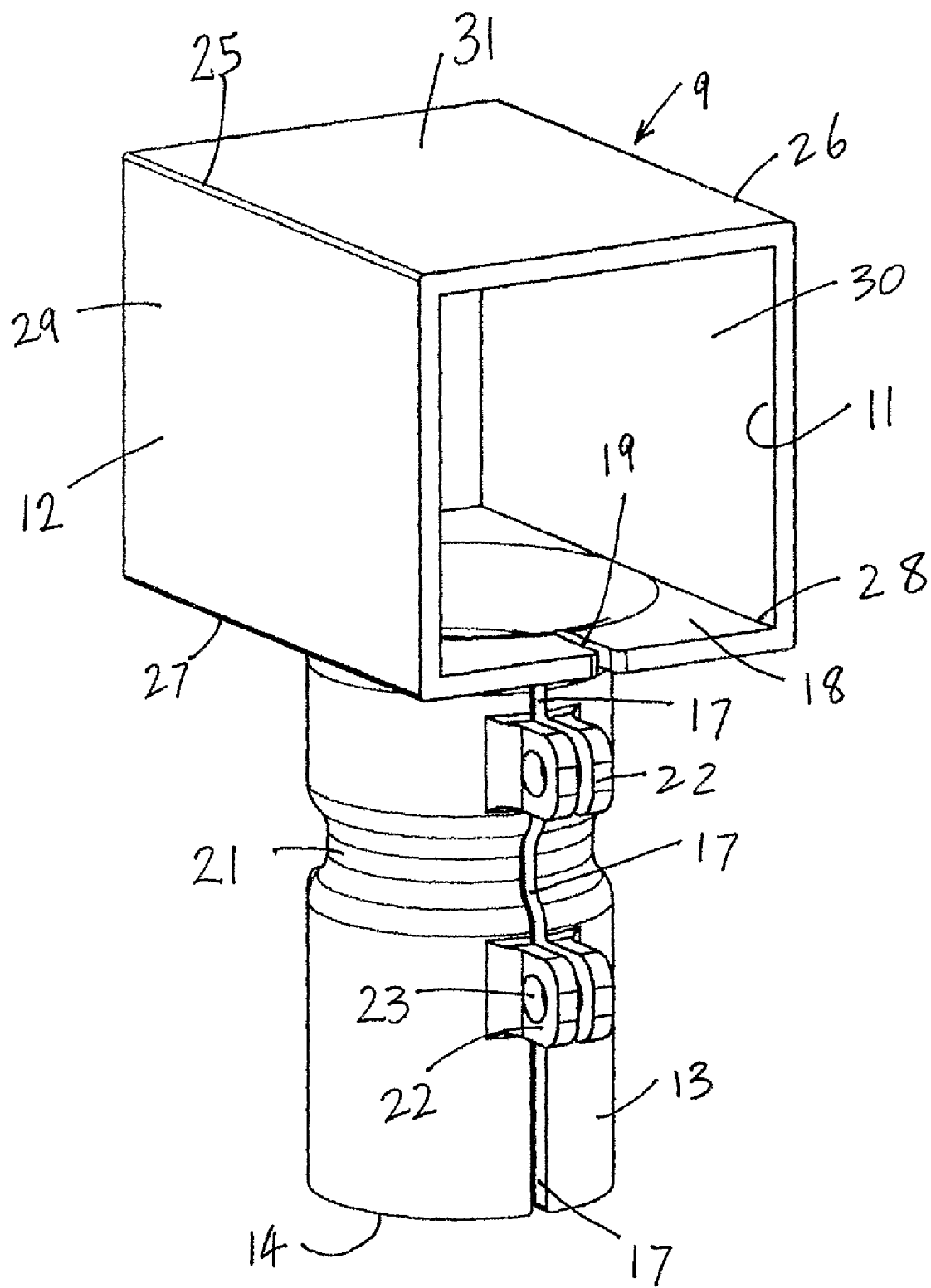
FIG. 5 is a further enlarged perspective view of the coupler as seen from one end.
Figure 6:
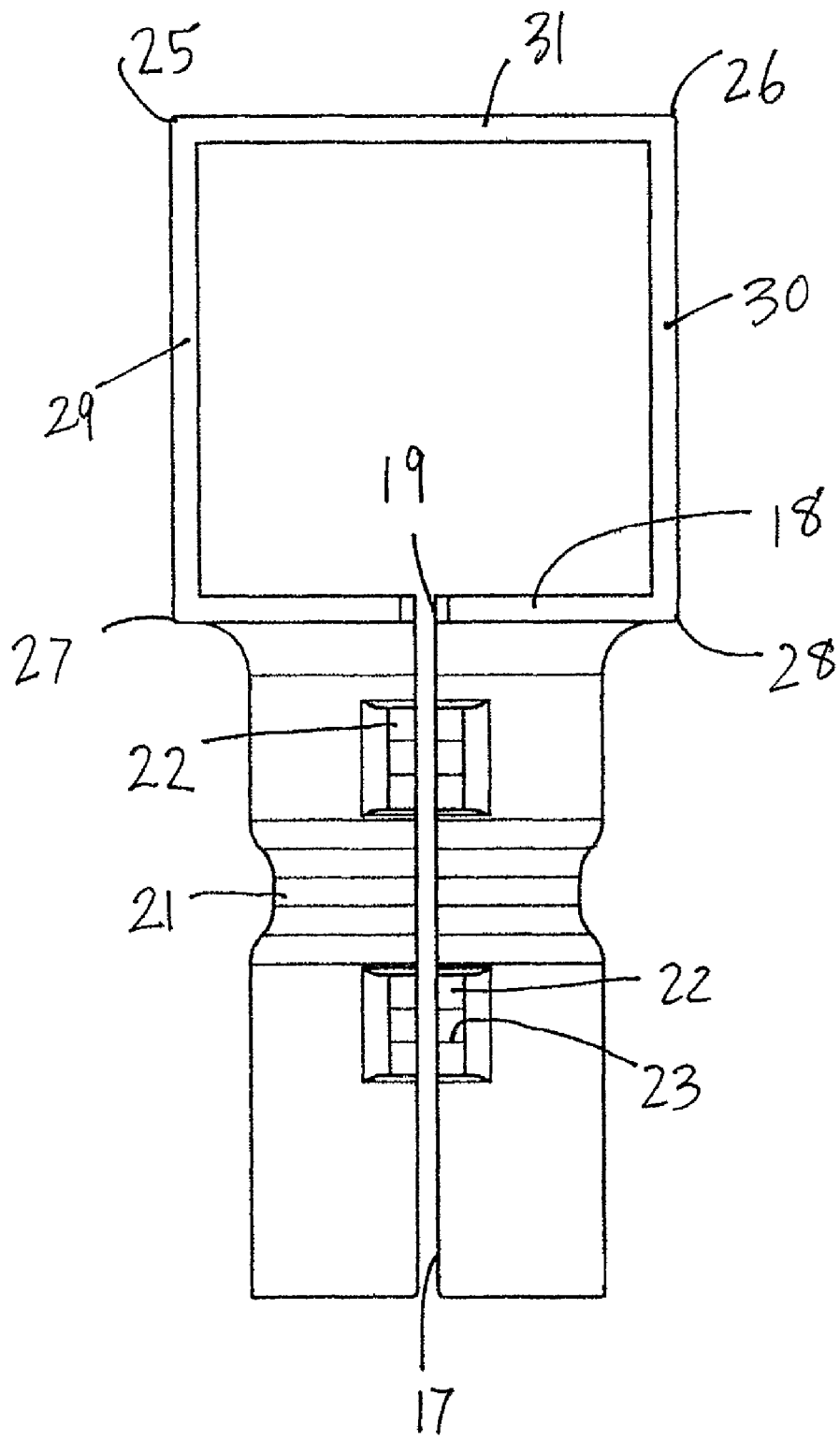
FIG. 6 shows the coupler of FIG. 5 in end elevation.
Figure 7:
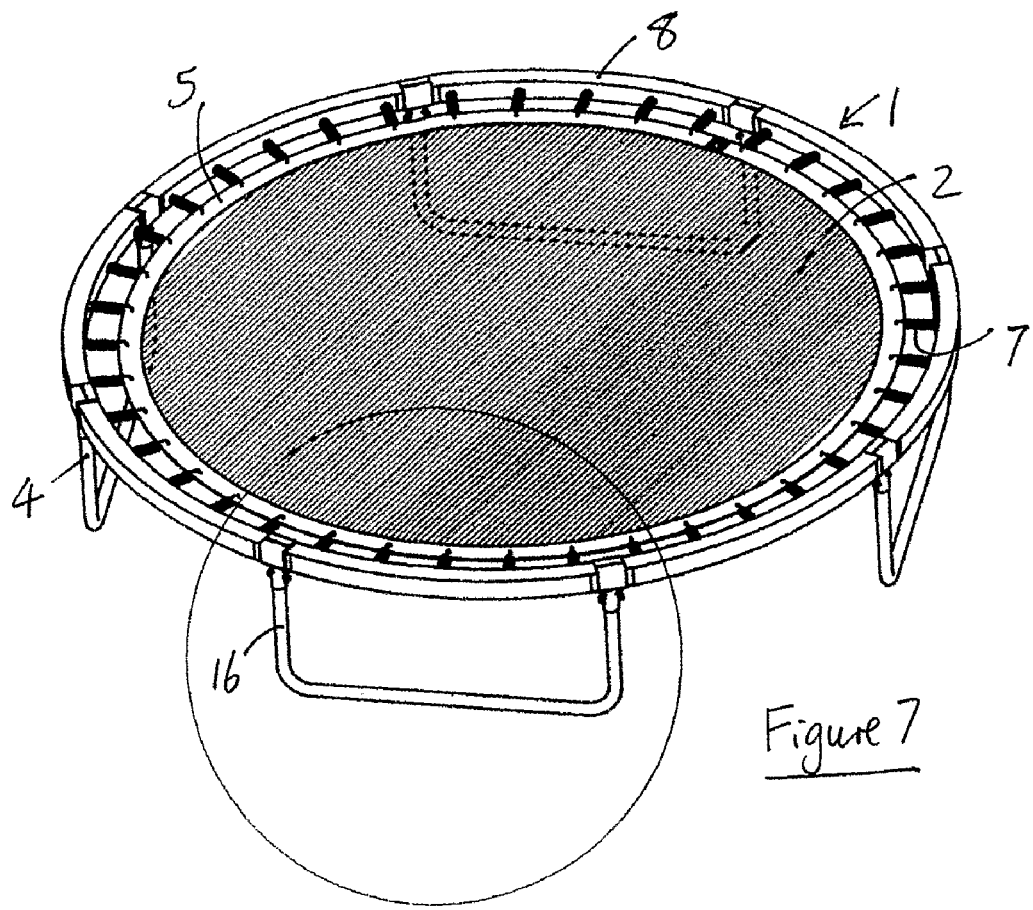
FIGS. 7 to 11 are views respectively similar to FIGS. 1 to 5 for an alternative embodiment of coupler.
Figure 8:
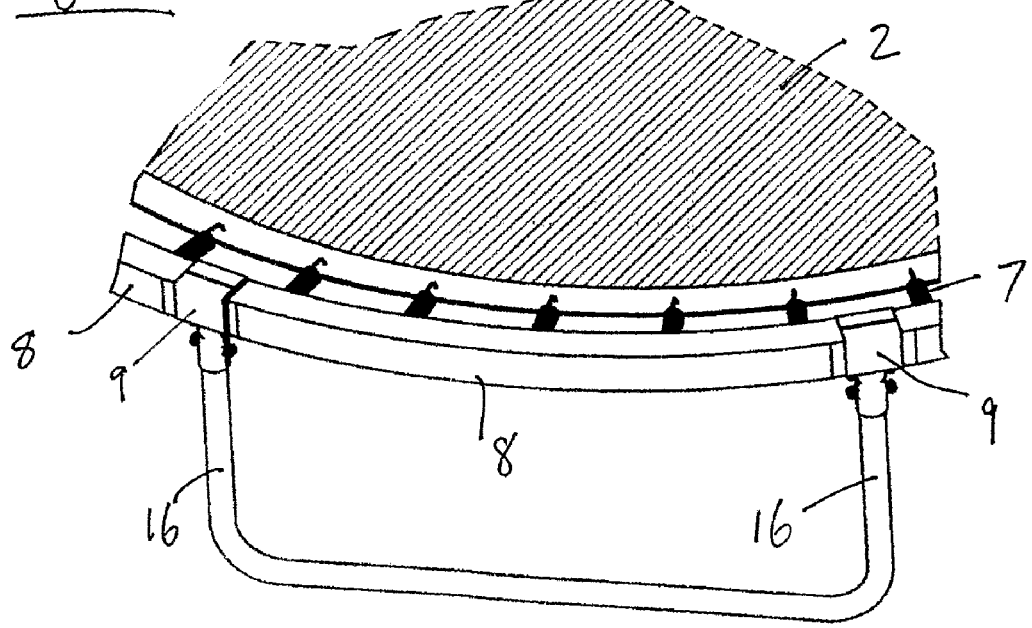
Figure 9:
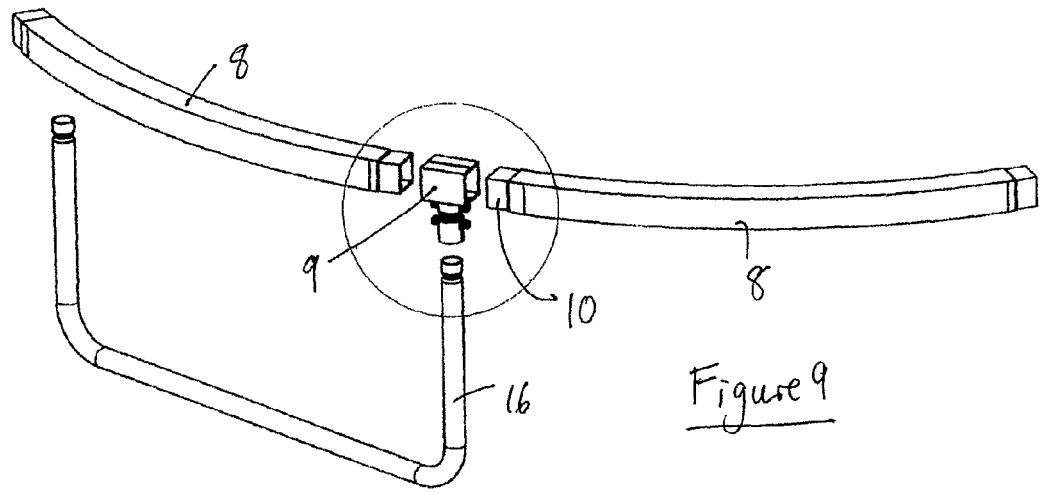
Figure 10:
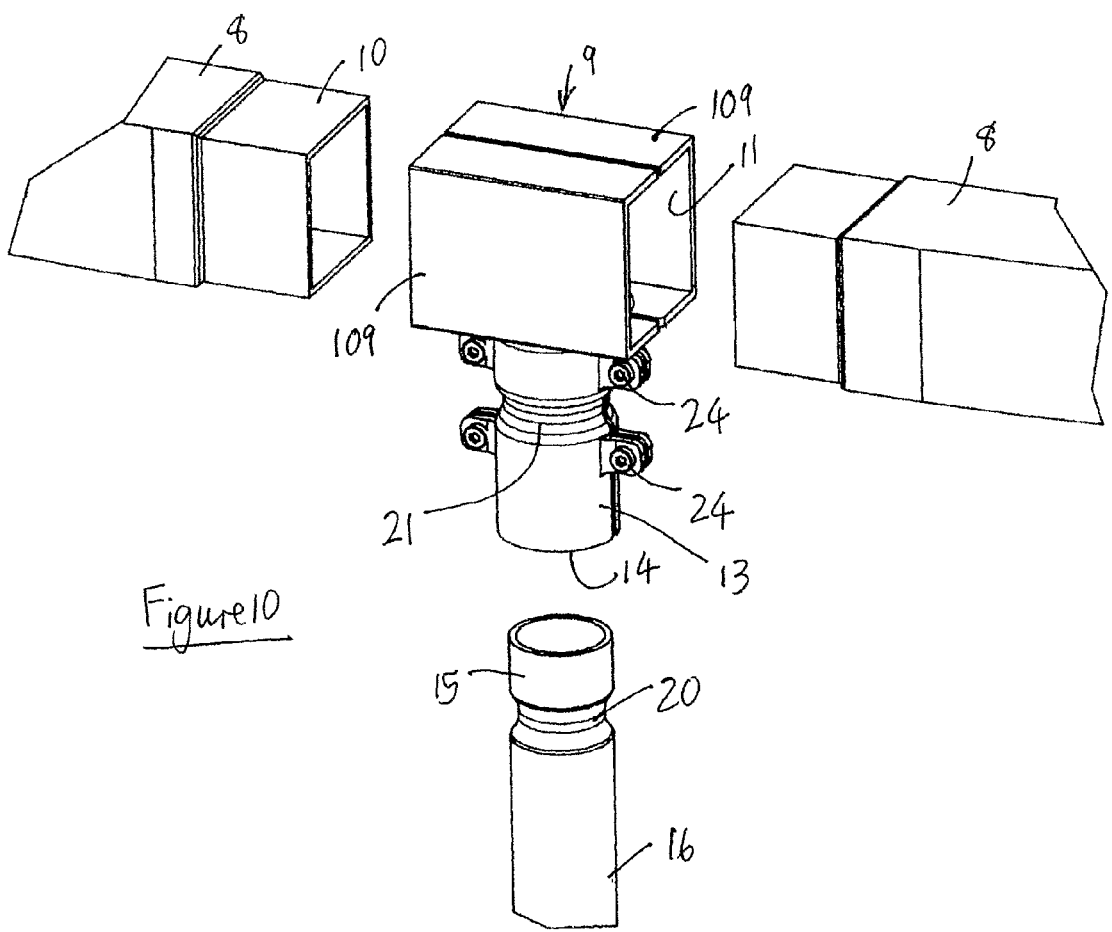

Coupler 9 may be cast as a single piece of plastics or cast or forged as a single piece of metal, being subsequently folded along lines 25 and 26, or along lines 25, 26, 27 and 28 to form side walls 29, 30 and top wall 31 of a four sided, preferably square, section cross piece as shown in FIGS. 4, 5 and 6. Underside 18 of cross piece 12 is of split form along its length, as noted above.

The illustrated arrangement has significant advantages over the arrangements of James and of Chu in that the upper end 15 of the leg 16 can readily be inserted into and correctly located within the upright piece 13 by cooperation between crimped regions 18 and groove 20, with ends of the tubular member being similarly readily located within the openings 11 at the ends of the cross piece, especially if the ends of the tubular portions have a slightly reduced cross-section at 10, as shown here; and then, following correct location, the coupler may be firmly tightened about the ends of the tubular members and the upper end of the leg simply by tightening the fixings 24, providing a reliably coupled structure.

A female-female-female coupling configuration is preferred for the coupler since the fixings will then help to keep the entire structure together, but either or both of the connections provided by the cross-piece could be male, the cross piece end then fitting within a female end of a tubular member, although this provides a less reliable coupling to the tubular members than with a female-female-female coupler.

Figure 11:
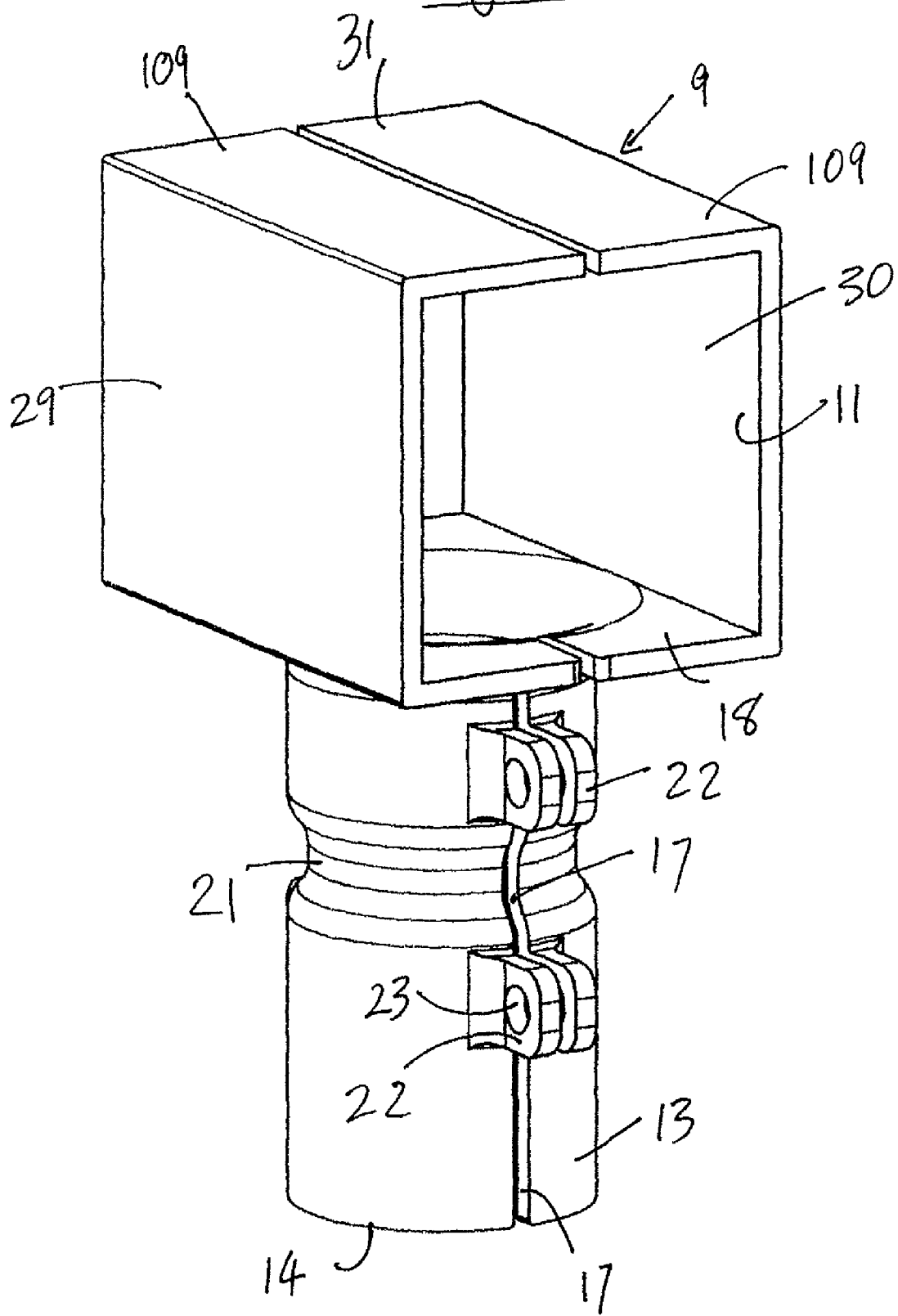
Figure 12:
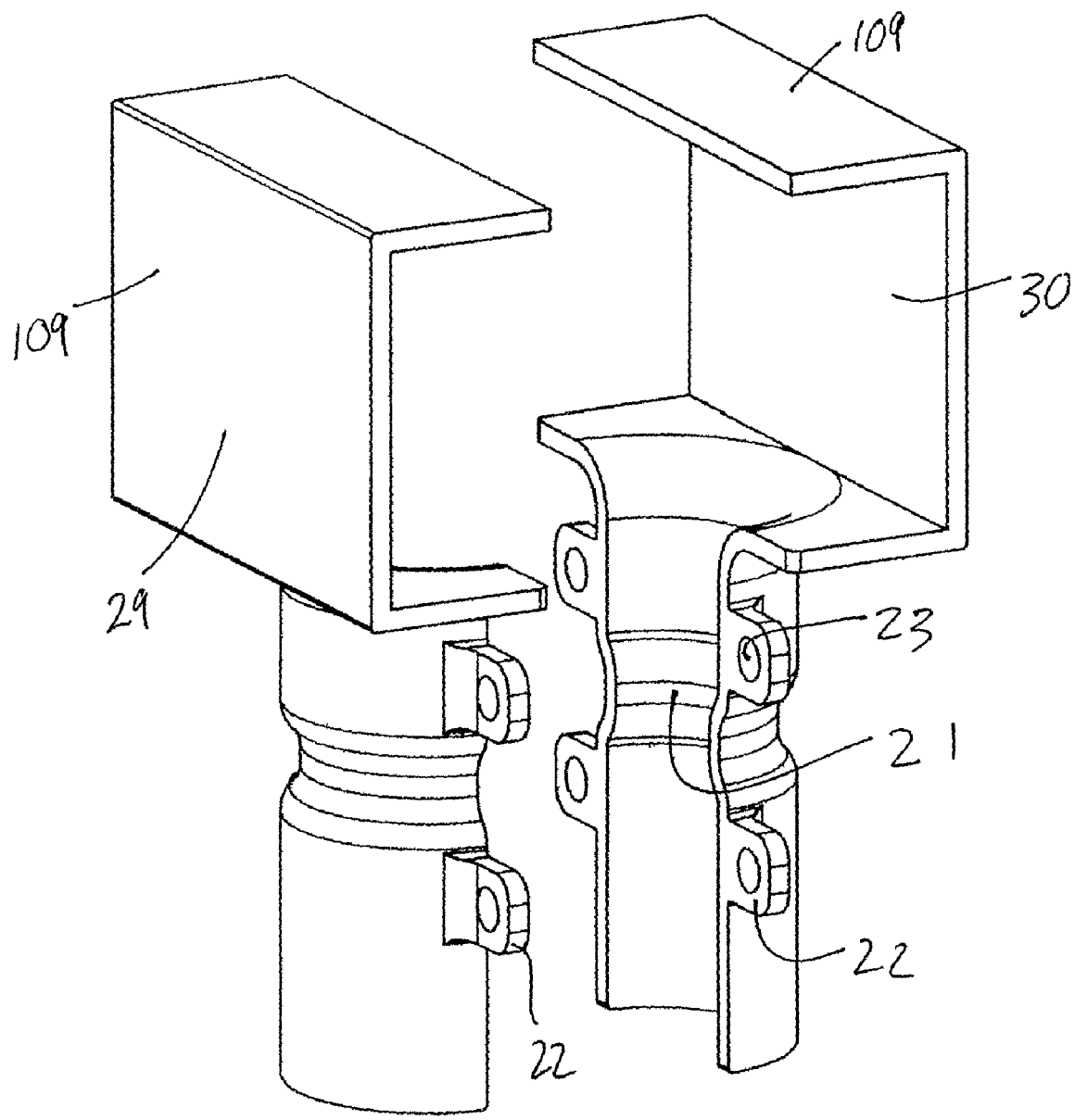
FIG. 12 is a view similar to FIG. 11 but with the two halves of the coupler separated.

FIGS. 7 to 12 show a variation of the arrangement of FIGS. 1 to 6 in which like reference numerals are used for like parts. However, as best shown in FIGS. 11 and 12, rather than being formed as a single piece of metal or plastics, the coupler 9 is formed as two separate complementary members 109. Members 109 are both mirror-images of each other and identical in the illustrated arrangement. In effect, top wall 31 of the cross piece is of split form along its entire length, as is underside 18. By forming the coupler in two parts, as shown in FIGS. 7 to 12, each such part may be cast or forged in a single piece without welding, and also without the need to form folds 25, 26, or 25, 26, 27 and 28, subsequently as in the arrangement of FIGS. 1 to 6. Although in two pieces rather than one, we have found that a coupler of this form still provides a strong and reliable coupling between ends of tubular members and the upper end of a leg in a trampoline frame support structure. Thus construction is simple and operation is reliable, with conventional fixings 24 holding the coupler together and providing reliable clamping about the ends of the tubular members and the upper end of the leg in a female-female-female coupling configuration.

Figure 13:
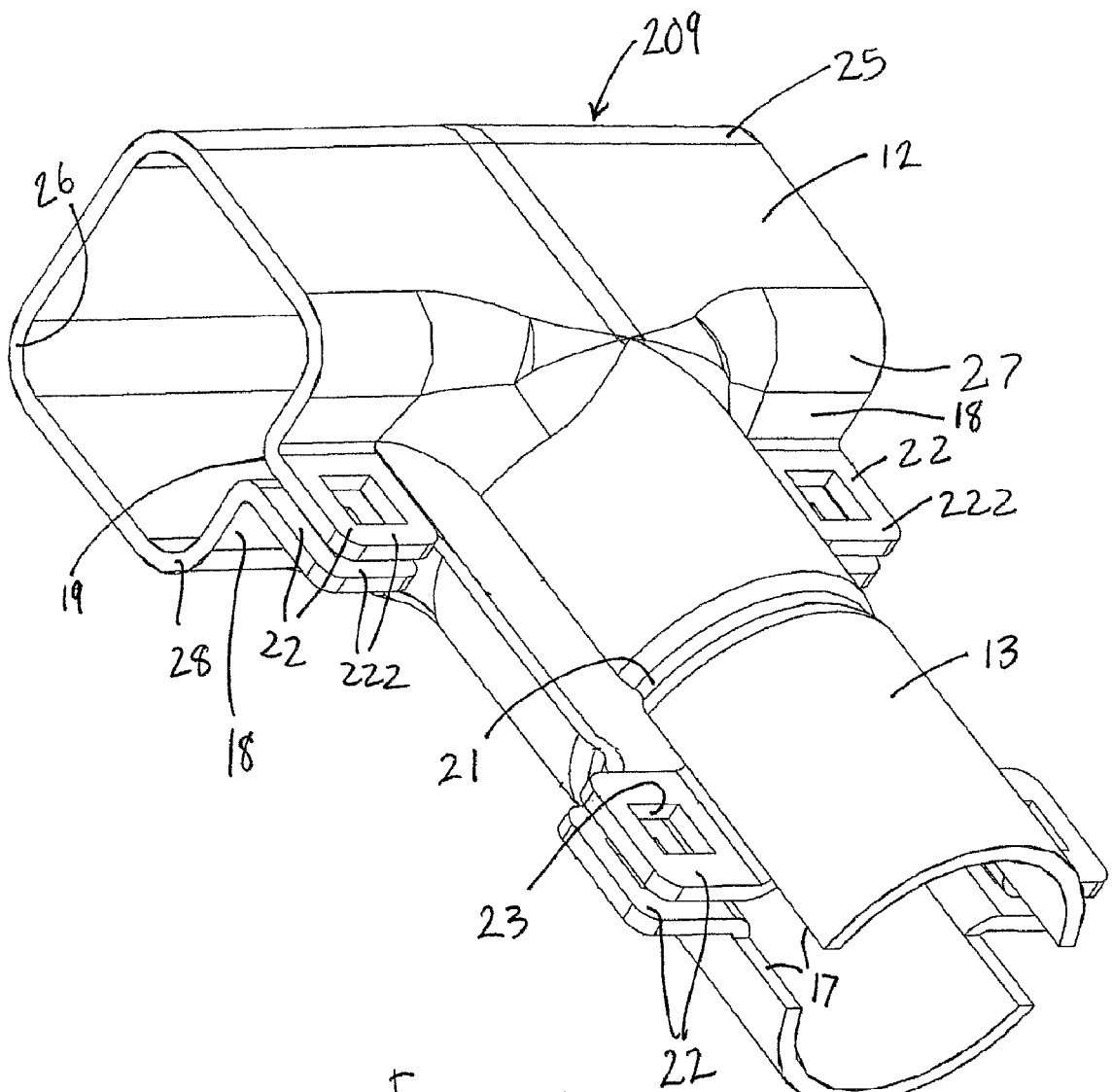
FIG. 13 is an overall perspective view of another embodiment of coupler.
Figure 14:
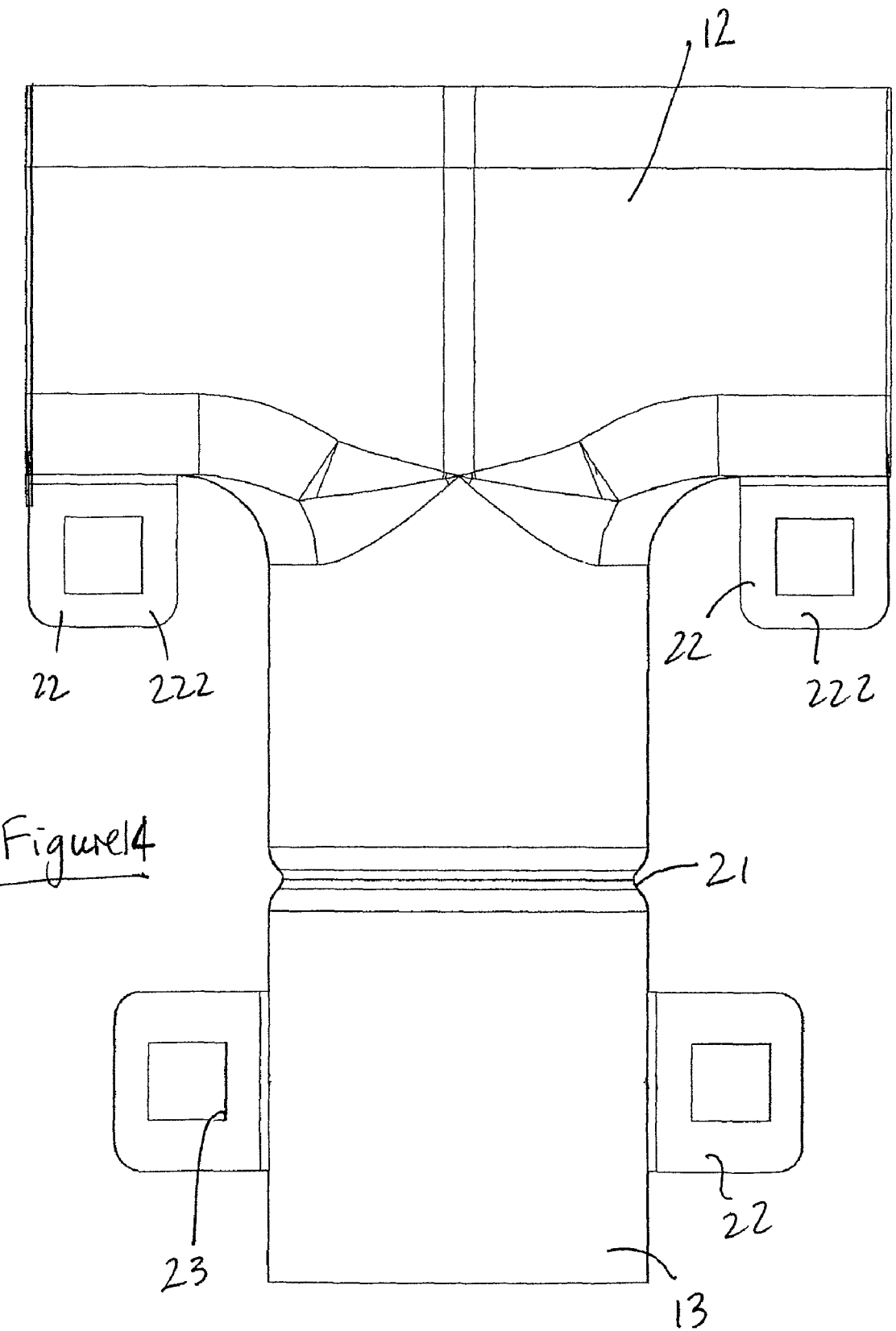
FIG. 14 is a front elevational view of the coupler of FIG. 13.

Referring now to FIGS. 13 and 14, an embodiment of coupler 209 is illustrated that is generally similar to the coupler 9 of FIGS. 1 to 6. For convenience, like reference numerals are employed for like parts.

Coupler 209 differs from coupler 9 in that the connections between cross piece 12 and the upright piece 13 are more rounded, and the folds or bends at lines 25, 26, 27 and 28 are similarly more rounded, both of which modifications simplify manufacture, whether the coupler is cast as a single piece or forged as a single piece of metal that is subsequently folded. The inwardly crimped portions 21 of coupler 209 are less extensive than in coupler 9, but equally effective with a correspondingly formed upper end of a leg of the trampoline support structure. It will also be seen that apertures 23 in flanges 22 are here shown with square cross-sections. This enables a bolt with a short section of its shank below its head having a square cross-section to be employed, the cooperating square cross-sections preventing the bolt rotating in aperture 23 while a nut is tightened on the bolt.

The significant difference between coupler 209 and coupler 9 lies in the disposition of the flanges 22. Here the uppermost pair of flanges 22, identified 222, are positioned at the edge of split 19 in the underside 18 of cross-piece 12 rather than on opposite sides of split 17 in the upright piece 13. When the coupler is formed from a single piece of metal that is folded, each flange 222 may simply be folded out of the plane of the corresponding portions of underside 18 with which it is integral. By repositioning one of the fixing positions as shown in FIGS. 13 and 14, the fixings through flanges 222 provide a more positive tightening of the female crosspiece about a male end portion of a tubular frame member of the trampoline support structure.

The modifications explained above with reference to FIGS. 13 and 14 may be applied with similar effect to the coupler illustrated in FIGS. 9 to 12 formed as two separate complementary members 109 that together form a complete coupler.

Figure 15:
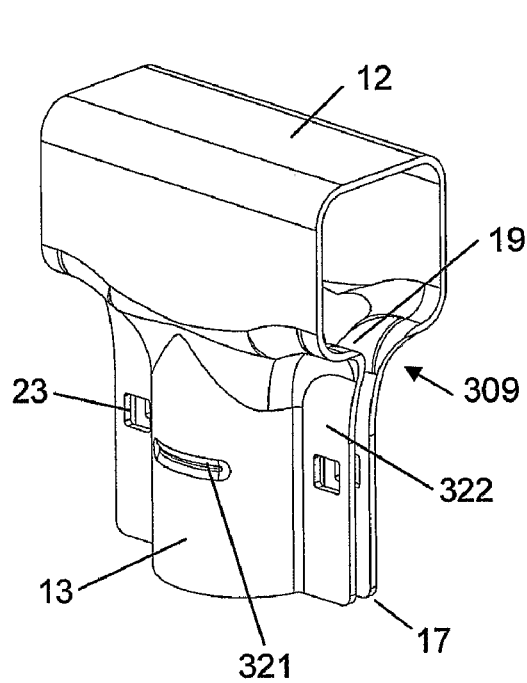
FIG. 15 is an overall perspective view of a further embodiment of coupler.
Figure 17:
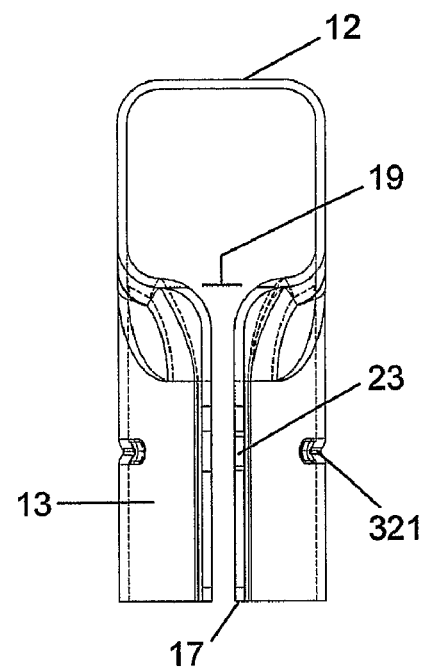
FIG. 17 is an end elevational view of the coupler of FIGS. 15 and 16.
Figure 16:
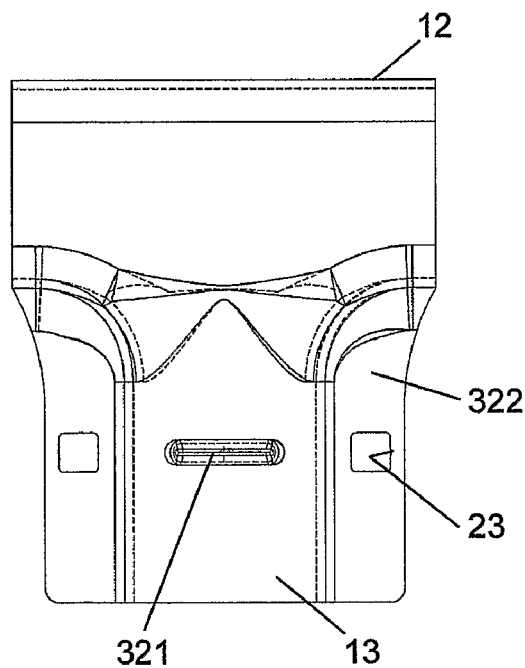
FIG. 16 is a front elevational view of the coupler of FIG. 15.
Figure 18:
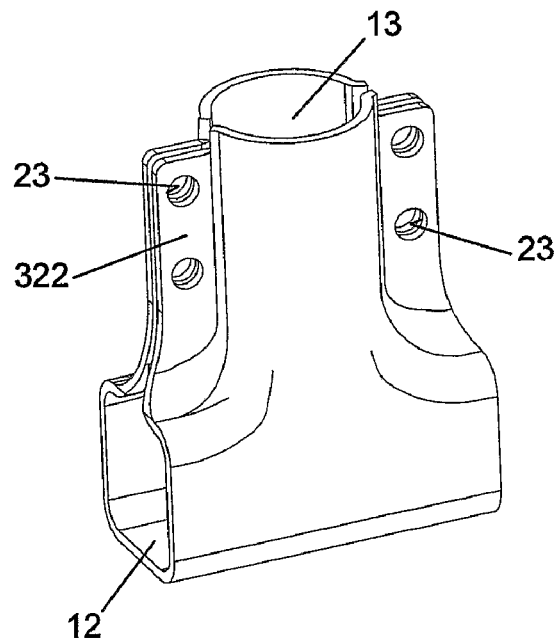
FIG. 18 is an overall perspective view of a variation of the further embodiment of FIGS. 15, 16 and 17.

FIGS. 15, 16 and 17 illustrate the most preferred embodiment of coupler, and FIG. 18 shows a variation of it. Again like reference numerals are employed for like parts. Coupler 309 is generally similar to coupler 209, but has a single much extended flange 22, identified 322, along the entire edge of the splits 17 and 19. The illustrated structure may be readily forged from a single piece of metal or formed or moulded as a single piece of plastics. Because the flange 322 unites both upright piece 13 and crosspiece 12, it adds to the overall strength of the coupler.

It will be seen that location of the upright member within upright piece 13 is achieved by inwardly crimped portions 21, here identified 321, that extend over part only of a circumextending path. The additional strength conferred by the continuous flange 322, together with location of the through apertures 23 for a cooperating bolt and nut on the flange at the same height up the upright as the crimped portions 321 allows the crimped portions to be less extensive in this embodiment. A single through aperture, as shown in FIGS. 15, 16 and 17, preferably with a square profile as in the embodiment of FIGS. 13 and 14, may suffice.

The variation shown in FIG. 18 is included in this disclosure to show that the preferred coupler of FIGS. 15, 16 and 17, may have a flange 322 that need not be fully coextensive with the splits 17 and 19, but may merely extend along substantially the entire length of the split. In this embodiment, flange 322 extends just short of the whole length of upright piece 13. In this case, two flange through apertures 23 are provided.

The invention claimed is:

1. A trampoline adapted for ready assembly comprising:
a plurality of upright leg members;
a trampoline frame supported by the upright leg members, the frame including
a plurality of tubular members that when coupled together form a structure to which a trampoline sheet is attached,
a plurality of hollow generally T-shaped couplers each coupling two adjacent tubular members end-to-end, each of the T-shaped couplers further being adapted to couple respective ends of the two adjacent tubular members to one of the upright leg members, neither manufacture of the coupler nor the manner of the coupler's coupling between the tubular members and the upright leg member requiring welds, the coupler including
a hollow cross piece adapted to couple in female fashion with respective male ends of the two tubular members, and
a hollow upright piece extending from an underside of and intersecting the cross piece and adapted to receive in female fashion a male end of the upright leg member, both the underside of the cross piece and sides of the upright piece being of split form along their respective lengths, the upright piece being provided with location regions adapted to cooperate with corresponding location regions on the male end of the upright leg member to locate the upright leg member in a predetermined position longitudinally relative to the upright piece, and
fixings adapted to draw the split sides together, thereby both to tighten the cross piece about the tubular members, and the upright piece about the male end of the upright leg member.

2. A trampoline according to claim 1, wherein the location regions on the upright leg member comprise an at least partially circumextending groove or land, and wherein the location regions on the upright piece comprise corresponding inwardly crimped portions in the upright piece.

3. A trampoline according to claim 1, wherein the cross piece is four sided in cross-section, at least ends of the tubular members being similarly four sided in cross-section.

4. A trampoline according to claim 3, wherein, apart from the fixings, the coupler is formed of a single piece of metal or plastics folded to form the four-sided cross-section of the cross piece.

5. A trampoline according to claim 1, wherein the cross piece has a top side opposite the said underside that is also split along its length, whereby the coupler, apart from the fixings, comprises two separate but complementary pieces of metal or plastics.

6. A trampoline according to claim 5, wherein the complementary pieces are mirror images of each other, and preferably are identical.

7. A trampoline according to claim 1, wherein the fixings are provided by bolts and nuts cooperating with through openings in flanges formed integrally with the upright piece adjacent the split.

8. A trampoline according to claim 7, wherein at least one of the fixings is provided by a bolt and nut cooperating with openings in flanges formed integrally with the cross piece adjacent the split in its underside.

9. A trampoline according to claim 7, wherein respective said flanges are formed on each side of the split in facing configuration to each other, each flange being provided with at least one opening for a cooperating bolt and nut, each flange being common both to the upright piece and the crosspiece.

10. A trampoline according to claim 9, wherein each said flange extends along substantially the entire length of the split.

11. A trampoline according to claim 1, wherein the fixings draw the split sides together such that the tubular members and the upright leg member are permanently coupled together.

12. A trampoline according to claim 1, wherein the fixings are disposed only on the hollow upright piece.

13. A trampoline according to claim 1, wherein the fixings are disposed only on the hollow upright piece and on an underside surface of the cross piece.

* * * * *